(No Model.)
L. S. FLATAU.
CULTIVATOR.
No. 468,764.  Patented Feb. 9, 1892.
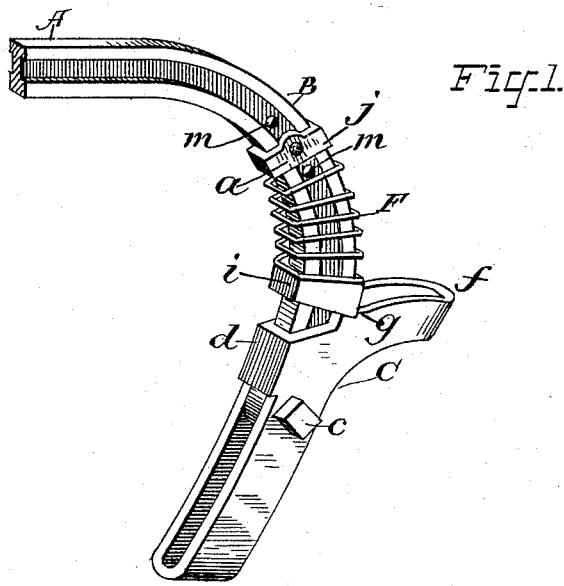
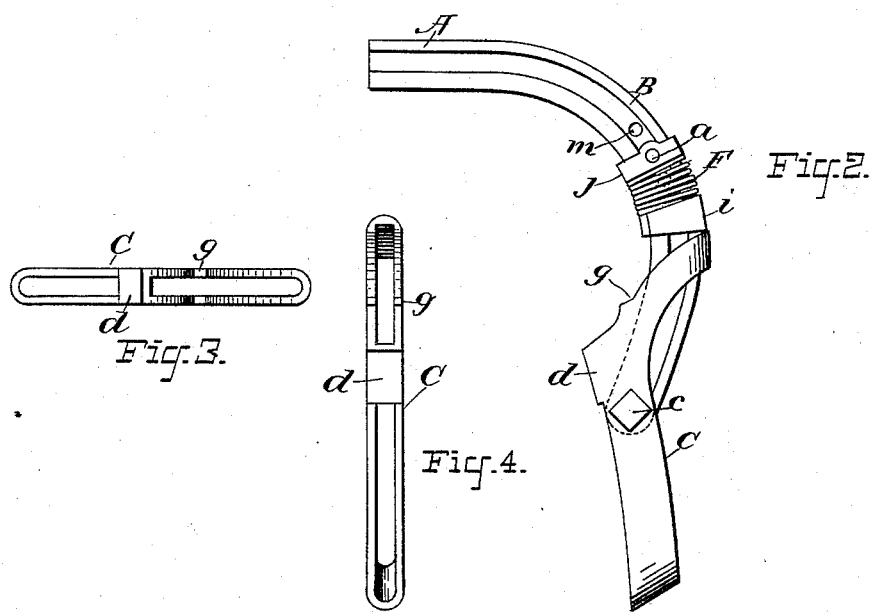
ATTEST:
INVENTOR:
Louis S. Flatau
By J. N. McIntire
Attorney

UNITED STATES PATENT OFFICE.

LOUIS S. FLATAU, OF PITTSBURG, TEXAS, ASSIGNOR TO B. F. AVERY & SONS, OF LOUISVILLE, KENTUCKY.

CULTIVATOR.

SPECIFICATION forming part of Letters Patent No. 468,764, dated February 9, 1892.

Application filed September 21, 1891. Serial No. 406,296. (No model.)

*To all whom it may concern:*

Be it known that I, LOUIS S. FLATAU, of Pittsburg, in the county of Camp and State of Texas, have invented a certain new and useful Improvement in Cultivators; and I do hereby declare that the following is a full, clear, and exact description of the same, reference being had to the accompanying drawings, forming part of this specification.

My invention relates to a cultivator implement of that class or species in which one or more devices, each of which may be a double-shovel or other cultivating device *per se*, is bolted or otherwise attached to a foot-piece or metal stem that is positively connected with the standard or downwardly-curved portion of the beam of the cultivator implement and that is adapted in the event of meeting any impassable obstruction in the soil to turn backward at its lower end and permit the cultivator implement to rise through the action of the draft-power and, with the assistance of the attendant, so as to pass over such immovable obstruction and thereafter perform its intended cultivating function or office.

I propose to provide for use in all sorts of cultivators or double shovels an improved spring-back foot which, while possessing a capacity to permit a rearward yielding of the lower portion or point of the cultivater blade or tooth whenever the latter shall meet with any unusual obstruction or resistance, shall be exceedingly simple and economic of manufacture and at the same time possess great durability and perfect efficiency of action.

To this main end and object my invention may be said to consist in the novel combinations of devices which will be found hereinafter more fully described, and which will be more particularly pointed out in the claims of this specification.

To enable those skilled in the art to which my invention relates to make and use cultivating implements of any of the species to which my invention is applicable, according to the improvements made the subject of this application, I will now proceed to more fully describe the different parts of my invention, referring by letters to the accompanying drawings, which form part of this specification, and in which I have shown my invention carried out in that precise form in which I have so far practiced it, although, of course, it may be used under various modifications or embodying either wholly or partially the primary and secondary parts of my invention.

In the drawings, Figure 1 is a perspective view of portion of a cultivator beam and standard having combined with or attached to its said standard a spring-back or yielding foot adapted to carry a suitable cultivator blade or shovel and having combined with it devices by means of which, after having been sprung backward at its lower portion by the contacting of the plate or shovel with a root, stone, or other impassable obstruction, will be returned automatically and immediately after having passed over such obstruction to its normal or working position. Fig. 2 is a side view or elevation of the parts seen in perspective at Fig. 1, but representing the spring-back foot as having been pushed rearwardly at its lower end and into a condition or position which will permit the cultivator or other implement to rise above and ride over the obstruction to the forward travel of the machine. Fig. 3 is a detail top view of the metallic foot-piece detached. Fig. 4 is a front view of said foot-piece detached.

In the several figures the same part, wherever visible, will be found designated by the same letter of reference.

A is a portion of the beam of a metallic-frame cultivator, of which the standard B is composed, of a downwardly bent or curved portion of the beam, as shown, and in a manner well known to those skilled in the art.

C is what I call a "spring-back foot," which in the case shown is composed of a metallic loop-like device, within which is located the lower end or portion of the standard B, to which said spring-back foot is pivoted or attached by means of a bolt *c*, said foot-piece C being formed or provided with a standard embracing or contacting strap-like portion *d*, that bears against the front edge of the beam B when the parts are in a working condition, and a closed end *f* at its upper loop-like portion, by means of which, as will be presently explained, the spring-back device C is permitted to turn backwardly at its lower end or oscillate upon its pivotal connection $e$ only to a given or predetermined extent, the portion $f$ coming into contact with the rear curved edge of the beam B and acting as a stop, all as will be presently more fully described.

Strung on the metallic beam B so as to slide or move easily thereon is a collar or loop-like washer $i$, the central aperture of which corresponds, substantially, in contour with the cross-sectional shape of the metallic beam B. This washer or collar $i$ operates to force into and hold in a working position the spring-back foot C through the medium of a compressed actuating spiral spring F, that, as shown, is arranged immediately above the sliding collar $i$, and that is confined between said collar and an immovable (but adjustable) collar $j$, that also surrounds the upper portion of the beam B, and that is made fast thereto at any one of several points by means of a bolt or metallic pin $a$, which passes through holes in the sides of the collar $j$, and also through some one of the three apertures $m$, made in the beam B. The upper curved edges of the loop-like spring-back foot C are formed, as shown, with similar notches $g$, in which notches or grooved depressions the lower, rear, and rounded corner of the sliding collar $i$ is seated, all as clearly shown in the drawings.

In view of the foregoing explanations as to the forms and relative arrangement of the parts the following brief description, read in connection with the drawings, will suffice to make clear the general operation of my improved contrivance.

Supposing the parts to be all in the working condition, as shown at Fig. 1, and assuming any suitable blade or cultivating-shovel, supposed to be attached to the lower forward portion of the foot C, to come into contact with a stone, root, or other obstacle, offering a hindrance to the forward movement or travel of the cultivating implement, the effect of coming against said obstruction will be to turn the spring-back foot C on its pivotal point of connection $e$ into the position shown at Fig. 2, in which position, it will be seen, the draft-power of the cultivator or plow will tend and operate to lift and drag the cultivator-blade over the otherwise impassable obstruction, the sliding collar $i$ being forced upwardly and spring F compressed or condensed by such pivotal movement of the foot C, all as clearly shown at Fig. 2, and immediately after the cultivating blade or tooth shall have passed over the obstruction the plow or cultivator will immediately resettle to its work, the powerful spiral spring F, by its expansive force against the sliding collar $i$, operating on the curved surface of the spring-back foot to aid in re-establishing the working condition of the parts. (Illustrated at Fig. 1.) In being forced backward at the rear end (and forwardly at its upper end) the spring-back foot C is prevented from being turned too far by contact of the closed loop-like end $f$ with the back edge of the curved metallic beam B, so that there is never any possible danger of the pivotally-arranged device C being oscillated beyond a proper position to permit its designed operation. In resuming its normal condition—i. e., the position seen at Fig. 1—the sliding collar $i$ acts at its lower rearward corner as a retaining-pawl coacting with the notches or depressions $g$ in the sides of the metallic device C, all in such manner that only by some undue and very severe strain upon the forward lower portion of the device C can the device be turned or thrown out of its normal or working condition. The degree of strain necessary to do this may be regulated or predetermined, according to circumstances, by a proper adjustment of the holdfast-collar $j$, so as to maintain the coil-spring F under more or less tension. This adjustable device $j$ may also be useful for the purpose merely of compressing the spring F more or less, accordingly as the said spring may be found to be unnecessarily strong or undesirably weak from wear or tear.

The part or portion $d$ of the spring-back foot C, which overlays the forward end of the standard B, operates as a stop against said standard, and, together with the pawl-like device $i$, effects a perfect interlocking or practically rigid attachment of the spring-back foot and standard when the parts of the implement are in their working condition.

Of course, so far as the main part of my invention is concerned, various modifications and changes in the details of construction may be made, and in carrying my invention into use the secondary features thereof may be disposed of in favor of some other detail construction, by means of which the primary part of my invention might be carried into effect.

Having now so fully explained the several parts of my invention that those skilled in the art can easily understand and practice the same, what I claim as new, and desire to secure by Letters Patent, is—

1. In combination with the metallic standard and oscillatory foot pivoted to said standard and made in the form of a flattened loop which surrounds the standard, a sliding spring-controlled device which also surrounds the standard and operating to hold said foot in a working condition against all ordinary strains, but permitting said foot to turn or swing on its pivotal connection whenever any impassable obstruction may be encountered and also operating to turn the foot to its working condition, all substantially in the manner hereinbefore set forth.

2. In combination with the standard, a pivotally-connected foot C and a spring-controlled sliding collar $i$, said collar being mounted to slide on the said standard and engaging with depressions or notches in the upper side portions of the pivoted loop-like foot-piece C, all in the manner and for the purposes hereinbefore set forth.

3. In combination with the standard B and the spring-back foot C, pivotally connected therewith and formed with an upwardly-curved loop-like portion $f$, the sliding pawl-like collar $i$, the spiral spring F, and the hold-fast-collar $j$, the whole constructed, arranged, and operating together in substantially the manner and for the purposes hereinbefore described.

In witness whereof I have hereunto set my hand this 24th day of July, 1891.

LOUIS S. FLATAU.

In presence of—
R. D. ANDERSON,
W. P. BRUCE.